US012807449B2

(12) United States Patent
Yoshida

(10) Patent No.: US 12,807,449 B2
(45) Date of Patent: Nov. 24, 2026

(54) SHEET CONVEYING APPARATUS AND IMAGE FORMING APPARATUS

(71) Applicant: CANON KABUSHIKI KAISHA, Tokyo (JP)

(72) Inventor: Hidefumi Yoshida, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 56 days.

(21) Appl. No.: 18/650,759

(22) Filed: Apr. 30, 2024

(65) Prior Publication Data

US 2024/0375907 A1 Nov. 14, 2024

(30) Foreign Application Priority Data

May 10, 2023 (JP) ................................ 2023-078126
Mar. 13, 2024 (JP) ................................ 2024-039125

(51) Int. Cl.
*B65H 43/04* (2006.01)
*B65H 29/62* (2006.01)
*G03G 15/00* (2006.01)

(52) U.S. Cl.
CPC ............ *B65H 43/04* (2013.01); *B65H 29/62* (2013.01); *B65H 2301/448* (2013.01); *G03G 15/703* (2013.01)

(58) Field of Classification Search
CPC .................... B65H 43/04; B65H 29/62; B65H 2301/448; G03G 15/703
See application file for complete search history.

(56) References Cited

U.S. PATENT DOCUMENTS 5,131,648 A * 7/1992 Ito ........................ G03G 15/703 271/262
2010/0187746 A1* 7/2010 Hirata ...................... B65H 7/12 271/259

FOREIGN PATENT DOCUMENTS

JP 2018150127 A 9/2018
JP 2018199565 A 12/2018

OTHER PUBLICATIONS

Machine translation of JP 2018-199565. (Year: 2018).*

* cited by examiner

*Primary Examiner* — Thomas A Morrison
(74) *Attorney, Agent, or Firm* — ROSSI, KIMMS & McDOWELL LLP

(57) ABSTRACT

A sheet conveying apparatus includes a sheet stacking portion, a sheet feeding portion, a sheet conveyance path, an escape conveyance path branching off from the sheet conveyance path at a branch-off portion, a sheet discharge portion, a double-feed detector configured to detect double-feed of the sheet at a detection position, and a controller. A path length in the sheet conveyance path from the detection position to the branch-off portion is shorter than a length of a conveyable sheet. The controller switches a mode between a first mode of discharging the sheet for which the double-feed has been detected onto the sheet discharge portion via the escape conveyance path and a second mode of stopping the sheet for which the double-feed has been detected on the sheet conveyance path without discharging the sheet onto the sheet discharge portion in accordance with timing at which the double-feed detector detects the double-feed.

10 Claims, 14 Drawing Sheets

SHEET CONVEYING APPARATUS AND IMAGE FORMING APPARATUS

BACKGROUND OF THE DISCLOSURE

Field of the Disclosure

The present disclosure relates to a sheet conveying apparatus and an image forming apparatus which discharge double-fed sheets onto a sheet discharge portion.

Description of the Related Art

In general, in an image forming apparatus such as a printer configured to form an image on a sheet, there has been known an issue called double-feed in which, when sheets are fed, a plurality of sheets are fed in an overlapping state. When the double-feed occurs, the sheets conveyed in the overlapping state (hereinafter also referred to as "double-fed sheets") are mixed into a printed product as a blank product having no image formed thereon. In particular, there is an issue in that, when sheets having images formed thereon are subjected to bookbinding or stapling, a blank product is interposed in the bound or stapled printed product. In view of this issue, there has been known a sheet conveying apparatus which has a double-feed detector mounted thereon and discharges, when the double-feed detector detects the double-fed sheets, the double-fed sheets to an escape conveyance path provided so as to branch off from a normal conveyance path (Japanese Patent Application Laid-Open No. 2018-199565).

The sheet conveying apparatus of Japanese Patent Application Laid-Open No. 2018-199565 is operable in a first mode and a second mode. In the first mode, when the double-feed detector detects the double-fed sheets, the double-fed sheets are discharged to the escape conveyance path provided so as to branch off from the normal conveyance path. In the second mode, when the double-fed sheets are sheets of a predetermined type, such as thin paper, the sheets are stopped on the conveyance path at a position at which a user can easily perform a discharging operation. The sheet conveying apparatus of Japanese Patent Application Laid-Open No. 2018-199565 can reduce the downtime by switching the mode between the first mode and the second mode. In recent years, the sheet conveying apparatus and the image forming apparatus have increasing needs of higher productivity and downsizing. Thus, it is required to shorten the conveyance path as much as possible to downsize the sheet conveying apparatus.

However, when the conveyance path is shortened, a time period from detection of the double-fed sheets to switching of the conveyance path from the normal conveyance path to the escape conveyance path is reduced, and there arises an issue in that the double-fed sheets cannot be conveyed to the escape conveyance path.

SUMMARY OF THE DISCLOSURE

According to an embodiment of the present disclosure, there is provided a sheet conveying apparatus including: a sheet stacking portion on which a sheet is to be stacked; a sheet feeding portion configured to feed the sheet stacked on the sheet stacking portion; a sheet conveyance path through which the sheet fed by the sheet feeding portion is to be conveyed; an escape conveyance path branching off from the sheet conveyance path at a branch-off portion; a sheet discharge portion to which the sheet conveyed through the escape conveyance path is to be discharged; a double-feed detector configured to detect double-feed of the sheet fed by the sheet feeding portion at a detection position located on an upstream side in a conveyance direction with respect to the branch-off portion, with a path length in the sheet conveyance path from the detection position to the branch-off portion being shorter than a length of a conveyable sheet; and a controller configured to execute, in a case in which the double-feed detector detects the double-feed, a first mode of discharging the sheet for which the double-feed has been detected onto the sheet discharge portion via the escape conveyance path, and a second mode of stopping the sheet for which the double-feed has been detected on the sheet conveyance path without discharging the sheet for which the double-feed has been detected onto the sheet discharge portion, wherein the controller is configured to switch a mode between the first mode and the second mode in accordance with timing at which the double-feed detector detects the double-feed.

Further features of the present disclosure will become apparent from the following description of exemplary embodiments with reference to the attached drawings.

DESCRIPTION OF THE EMBODIMENTS

In the following, embodiments of the present disclosure are described with reference to the drawings.

First Embodiment (Image Forming Apparatus)

Figure 1:
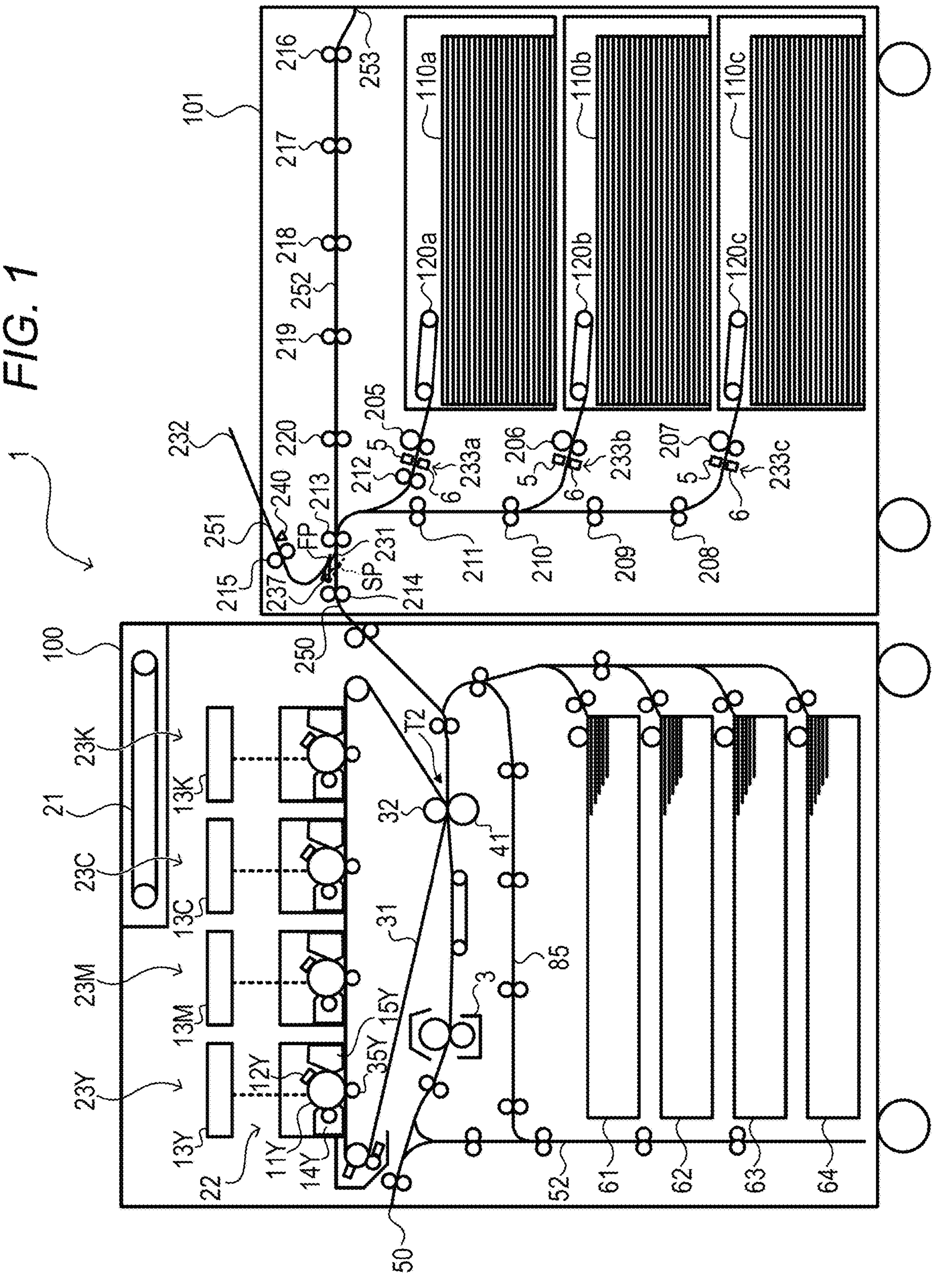
FIG. 1 is a cross-sectional view for illustrating a printer of a first embodiment.

An overall configuration of a printer 1 serving as an image forming apparatus according to a first embodiment is described with reference to FIG. 1. FIG. 1 is a cross-sectional view for illustrating the printer 1 of the first embodiment. As illustrated in FIG. 1, the printer 1 serving as the image forming apparatus includes an apparatus main body 100 configured to form an image to a sheet, and a paper deck 101 configured to feed the sheet to the apparatus main body 100. The paper deck 101 serving as a sheet conveying apparatus (sheet feeding unit) is removably connected to the apparatus main body 100. The paper deck 101 is a large-capacity stacker in which a larger amount of sheets are stackable as compared to sheet cassettes (sheet feeding portions) 61, 62, 63, and 64 provided in the apparatus main body 100. In the first embodiment, the paper deck 101 is connected to the apparatus main body 100, but the paper deck 101 may be formed integrally with the apparatus main body 100 to form the printer 1. As another example, the paper deck 101 may be connected to the printer 1 via a relay conveyance portion (not shown).

(Apparatus Main Body)

An image reading portion 21 is provided in an upper portion of the apparatus main body 100. The image reading portion 21 includes a scanning optical system configured to read an image of an original. On a lower side of the image reading portion 21, an image forming portion 22 configured to form an image to a sheet serving as a recording medium is provided. Below the image forming portion 22, the plurality of sheet cassettes 61, 62, 63, and 64 of a front loading type are provided. The plurality of sheet cassettes 61, 62, 63, and 64 store sheets and are mounted so as to be insertable and drawable from the front side of the apparatus main body 100.

The image forming portion 22 includes image forming stations 23Y, 23M, 23C, and 23K configured to form images of respective colors of yellow Y, magenta M, cyan C, and black K. The image forming portion 22 is of a tandem type in which the image forming stations 23Y, 23M, 23C, and 23K are arranged side by side along an intermediate transfer belt 31. The yellow image forming station 23Y includes a photosensitive drum 11Y. The yellow image forming station 23Y further includes a charging device 12Y, an exposure device 13Y, a developing device 14Y, a primary transfer roller 35Y, and a cleaning blade 15Y which are provided around the photosensitive drum 11Y.

The charging device 12Y charges a surface of the photosensitive drum 11Y to a predetermined potential, and the exposure device 13Y forms an electrostatic latent image on the surface of the photosensitive drum 11Y uniformly charged by the charging device 12Y. Further, the developing device 14Y develops the electrostatic latent image formed on the photosensitive drum 11Y with toner to form a toner image. The primary transfer roller 35Y forms a primary transfer nip between the photosensitive drum 11 and the intermediate transfer belt 31. A transfer bias is applied to the primary transfer roller 35Y so that the primary transfer roller 35Y transfers the toner image formed on the photosensitive drum 11Y onto the intermediate transfer belt 31. Further, the cleaning blade 15Y abuts against the surface of the photosensitive drum 11Y on the downstream side of the primary transfer nip to remove residual toner remaining on the surface of the photosensitive drum 11Y after the primary transfer. Other image forming stations 23M, 23C, and 23K basically have configurations similar to the configuration of the yellow image forming station 23Y except for the color of the toner to be used, and hence description thereof is omitted.

The intermediate transfer belt 31 forms, on the downstream side of the black image forming station 23K, together with a secondary transfer inner roller 32 and a secondary transfer outer roller 41, a secondary transfer portion T2 at which the toner image formed on the surface of the intermediate transfer belt 31 is transferred onto the sheet. A fixing device 3 is provided on the downstream side of the secondary transfer portion T2 in a conveyance direction of the sheet. The fixing device 3 applies pressure and heat to the sheet having the toner image transferred thereon so that the toner image is fixed to the sheet. Thus, an image is formed on the sheet.

In a case in which the printer 1 forms an image on the sheet in accordance with image information read by the image reading portion 21, the image reading portion 21 photoelectrically converts the image information and transmits the information to the exposure devices 13Y, 13M, 13C, and 13K. The image forming stations 23Y, 23M, 23C, and 23K form toner images of respective colors in accordance with the image information. The toner image formed on the surface of the photosensitive drum 11Y in the image forming station 23Y is transferred (primarily transferred) onto the surface of the intermediate transfer belt 31 by the primary transfer roller 35Y. Similarly, the image forming stations 23M, 23C, and 23K transfer the toner images of the respective colors onto the surface of the intermediate transfer belt 31. The toner images superimposed on the surface of the intermediate transfer belt 31 are transferred (secondarily transferred), at the secondary transfer portion T2, onto the surface of the sheet fed from the sheet cassettes 61 to 64 or the paper deck 101.

The fixing device 3 applies heat and pressure to the sheet having the toner images transferred thereon at the secondary transfer portion T2, and the toner images are fused on the surface of the sheet. In a case in which an image forming mode designated by the user is a simplex-printing image forming mode, the sheet having the image formed thereon is discharged to the outside of the apparatus main body 100 through a discharge port 50. Meanwhile, in a case in which the image forming mode designated by the user is a duplex-printing image forming mode, the sheet having the image formed on one surface thereof is conveyed to a reverse path 52 to pass through a duplex-printing path 85, and is conveyed to the image forming portion 22 again.

(Paper Deck)

The configuration of the paper deck 101 is described. As illustrated in FIG. 1, the paper deck 101 includes large-capacity sheet stacking portions 110*a*, 110*b*, and 110*c* and feeding portions 120*a*, 120*b*, and 120*c* corresponding to the respective sheet stacking portions 110*a*, 110*b*, and 110*c*. The capacity of each of the plurality of sheet stacking portions 110*a*, 110*b*, and 110*c* is larger than the capacity of each of the sheet cassettes 61, 62, 63, and 64 provided in the apparatus main body 100. The plurality of feeding portions 120*a*, 120*b*, and 120*c* feed the sheets stacked on the sheet stacking portions 110*a*, 110*b*, and 110*c*, respectively. The feeding portions 120*a*, 120*b*, and 120*c* are each a suction conveyance unit configured to loosen sheets on a corresponding one of the sheet stacking portions 110*a*, 110*b*, and 110*c* by a corresponding one of a first feeding fan 236*a*, a second feeding fan 236*b*, and a third feeding fan 236*c* illustrated in FIG. 2, and suck a sheet to a belt to convey the sheet.

The paper deck 101 includes a sheet conveyance path 250 and an escape conveyance path 251 that branches off from the sheet conveyance path 250. The sheets fed from the sheet stacking portions 110*a*, 110*b*, and 110*c* pass through the sheet conveyance path 250 to be conveyed to the apparatus main body 100. A plurality of conveyance roller pairs 205, 206, 207, 208, 209, 210, 211, 212, 213, and 214 are arranged on the sheet conveyance path 250. The plurality of conveyance roller pairs 205, 206, 207, 208, 209, 210, 211, 212, 213, and 214 convey the sheets fed from the sheet stacking portions 110*a*, 110*b*, and 110*c* to the apparatus main body 100. In the first embodiment, the sheet conveyance path refers to a path through which the sheet passes in a process of feeding the sheet from the sheet cassettes 61, 62, 63, and 64 and the sheet stacking portions 110*a*, 110*b*, and 110*c*, forming an image on the sheet, and discharging the sheet to the outside of the apparatus main body 100 through the discharge port 50. The sheet conveyance path 250 forms a sheet conveyance path in the paper deck 101.

Meanwhile, two or more overlapping sheets (double-fed sheets) fed from the sheet stacking portions 110*a*, 110*b*, and 110*c* are discharged through the escape conveyance path 251 onto an escape tray 232. The escape conveyance path 251 branches off upward from a midway portion of the sheet conveyance path 250, at a branch-off portion 231 on the downstream side of the conveyance roller pair 213. On the escape conveyance path 251, an escape conveyance roller pair 215 serving as a sheet conveyance unit configured to convey a sheet is arranged. The sheet conveyed by the escape conveyance roller pair 215 is discharged from a terminal end portion of the escape conveyance path 251 onto the escape tray 232 (sheet discharge portion) provided on an upper surface of the paper deck 101.

In an upper portion of the paper deck 101, a sheet conveyance path 252 extending from a right inlet 253 of the paper deck 101 to the sheet conveyance path 250 is provided. The sheet conveyance path 252 joins the sheet conveyance path 250 on the upstream side of the conveyance roller pair 213. The sheet conveyance path 252 has conveyance roller pairs 216, 217, 218, 219, and 220 provided thereon. Another paper deck can be further connected on the right side of the paper deck 101 for expansion. The sheet fed from the paper deck connected for expansion passes from the inlet 253 through the sheet conveyance path 252 by the conveyance roller pairs 216, 217, 218, 219, and 220 to be conveyed to the sheet conveyance path 250, and is thus conveyed to the apparatus main body 100.

Double-feed detectors 233*a*, 233*b*, and 233*c* are provided on the downstream side of the respective conveyance roller pairs 205, 206, and 207 configured to convey the sheets fed by the respective feeding portions 120*a*, 120*b*, and 120*c* to the sheet conveyance path 250. The double-feed detectors 233*a*, 233*b*, and 233*c* detect double-feed in which two or more overlapping sheets are fed. In the following description, when there is no need to distinguish the plurality of double-feed detectors 233*a*, 233*b*, and 233*c*, the plurality of double-feed detectors 233*a*, 233*b*, and 233*c* are comprehensively referred to as "double-feed detector 233." In a case in which the double-feed detector 233 detects the double-feed in which two or more overlapping sheets are fed, the double-fed sheets pass through the escape conveyance path 251 branching off from the sheet conveyance path 250 at the branch-off portion 231 to be discharged onto the escape tray 232 serving as a double-fed sheet discharge portion. A length of a conveyance path from a detection position of the double-feed detector 233*a* to the branch-off portion 231 is shorter than a length in the conveyance direction of a conveyable sheet. A length of a conveyance path from a detection position of the double-feed detector 233*b* to the branch-off portion 231 is shorter than the length in the conveyance direction of the conveyable sheet. A length of a conveyance path from a detection position of the double-feed detector 233*c* to the branch-off portion 231 is shorter than the length in the conveyance direction of the conveyable sheet.

In the first embodiment, the branch-off portion 231 is provided in the paper deck 101, and hence the branch-off portion 231 is located on the upstream side of the image forming portion 22 of the apparatus main body 100 in the conveyance direction of the sheet. Thus, the double-fed sheets are discharged onto the escape tray 232 without being conveyed through the image forming portion 22. Sheets other than the double-fed sheets are also sometimes discharged onto the escape tray 232. For example, in a case in which jamming occurs in the printer 1, sheets (residence sheets) other than the jammed sheet, which remain inside of the paper deck 101, may pass through the escape conveyance path 251 to be discharged onto the escape tray 232.

In the first embodiment, the double-feed detector 233 is an ultrasonic sensor including an ultrasonic oscillator 5 and an ultrasonic receiver 6. An ultrasonic wave oscillated from the ultrasonic oscillator 5 is attenuated when passing through the double-fed sheets being two or more overlapping sheets, and the attenuated ultrasonic wave is received by the ultrasonic receiver 6. Whether or not the sheet passing through the double-feed detector 233 is double-fed sheets is detected based on an attenuation degree of the ultrasonic wave detected by the double-feed detector 233. The double-feed detector 233 need not necessarily be an ultrasonic sensor. The double-feed detector 233 may be, for example, an optical sensor.

(Control Device)

Figure 2:
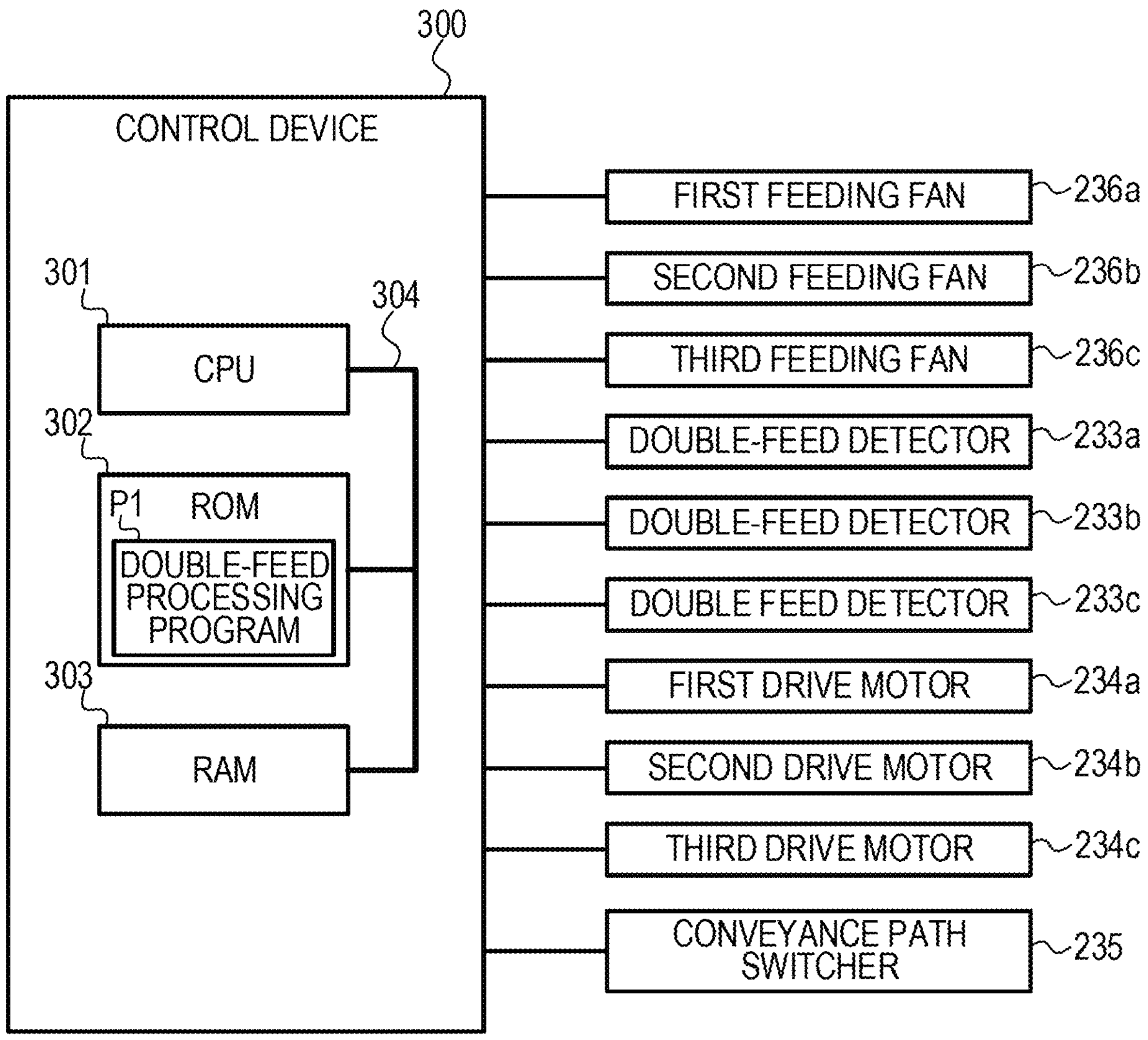
FIG. 2 is a block diagram for illustrating a control device in the first embodiment.

A configuration of a control device 300 of the paper deck 101 in the first embodiment is described. FIG. 2 is a block diagram for illustrating the control device 300 in the first embodiment. As illustrated in FIG. 2, the control device 300 includes a central processing unit (CPU) 301 serving as an arithmetic unit configured to execute various arithmetic operations, and a read only memory (ROM) 302 and a random access memory (RAM) 303 which form a storage unit. The RAM 303 functions as a working area of the CPU 301. The ROM 302 has stored therein various programs to be used for control of the paper deck 101. The CPU 301, the ROM 302, and the RAM 303 are connected to each other through a bus-type connection communication line 304.

The control device 300 is electrically connected to the double-feed detectors 233*a*, 233*b*, and 233*c*. The control device 300 is electrically connected to a first drive motor 234*a*, a second drive motor 234*b*, and a third drive motor 234*c*. The first drive motor 234*a* drives the conveyance roller pairs 205 to 214 and the conveyance belts configured to suck and convey the sheets in the respective feeding portions 120*a*, 120*b*, and 120*c*. The second drive motor 234*b* drives the conveyance roller pairs 216 to 220. The third drive motor 234*c* drives the escape conveyance roller pair 215. The control device 300 is electrically connected to the first feeding fan 236*a*, the second feeding fan 236*b*, and the third feeding fan 236*c*. The control device 300 is electrically connected to a conveyance path switcher 235.

(Conveyance Path Switcher)

Figure 3A:
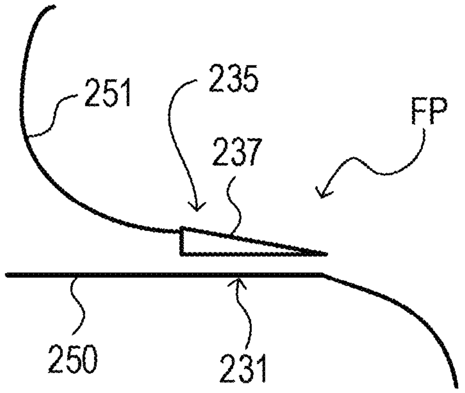
FIG. 3A and FIG. 3B are explanatory views for illustrating an operation of a conveyance path switcher.
Figure 3B:
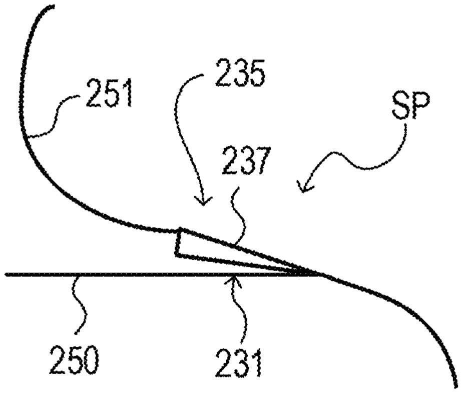

The conveyance path switcher 235 is described with reference to FIG. 3A and FIG. 3B. FIG. 3A and FIG. 3B are explanatory views for illustrating the operation of the conveyance path switcher 235. The conveyance path switcher 235 includes a switching member (flapper) 237 provided at the branch-off portion 231. The posture of the switching member 237 is movable between a first position FP and a second position SP. The position of the switching member 237 can be switched between the first position FP and the second position SP by a solenoid (not shown). As illustrated in FIG. 3A, when the switching member 237 is located at the first position FP, the sheet is conveyed to the sheet conveyance path 250. As illustrated in FIG. 3B, when the switching member 237 is located at the second position SP, the sheet is conveyed to the escape conveyance path 251.

In this case, the ROM 302 has stored therein a double-feed processing program P1 to be executed in the case in which the double-feed detectors 233*a*, 233*b*, and 233*c* detect double-feed of sheets. In the first embodiment, the double-feed detector 233*a* detects double-feed of sheets fed from the sheet stacking portion 110*a*. The double-feed detector 233*b* detects double-feed of sheets fed from the sheet stacking portion 110*b*. The double-feed detector 233*c* detects double-feed of sheets fed from the sheet stacking portion 110*c*.

In a case in which jamming occurs in the fixing device 3 of the apparatus main body 100, a residence sheet nipped by the conveyance roller pair 210 or 211 of the paper deck 101 is automatically discharged onto the escape tray 232 via the escape conveyance path 251. In a case in which the residence sheet is automatically discharged, the control device 300 drives the escape conveyance roller pair 215 by the third drive motor 234*c*. The residence sheet is automatically discharged onto the escape tray 232, and hence the sheet retained by the conveyance roller pair 210 or 211 can be easily removed without causing the user to open a door of the paper deck 101. In the case in which the double-feed detector 233*a*, 233*b*, or 233*c* detects the double-feed of sheets, the control device 300 drives the escape conveyance roller pair 215 by the third drive motor 234*c* to discharge the double-fed sheets onto the escape tray 232 via the escape conveyance path 251.

(Double-Feed Detector)

Figure 4A:
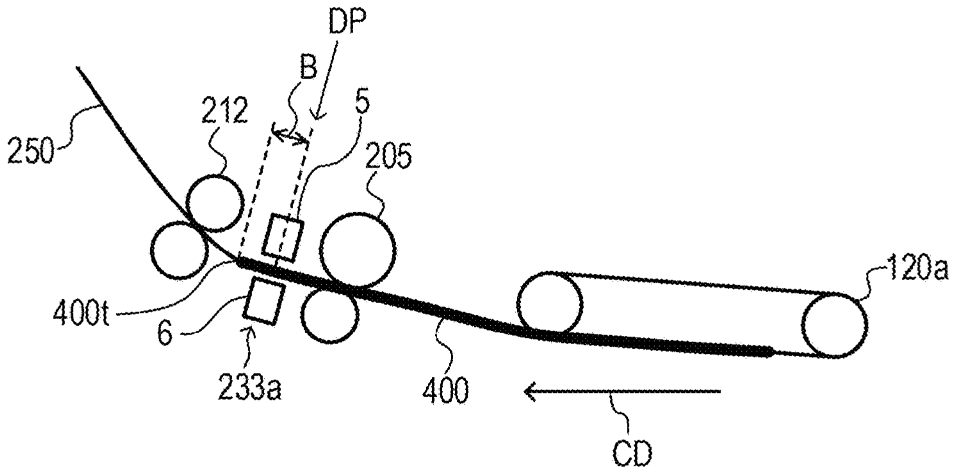
FIG. 4A, FIG. 4B, and FIG. 4C are enlarged views of a sheet conveyance path from a feeding portion to a conveyance roller pair.
Figure 4B:
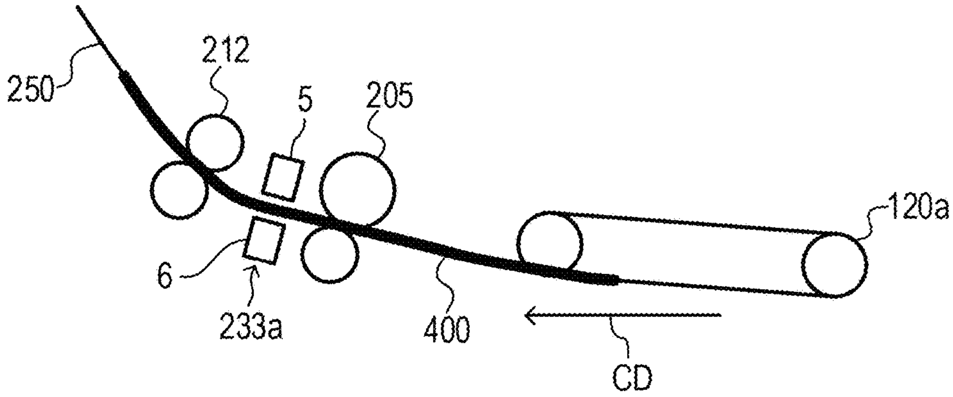
Figure 4C:
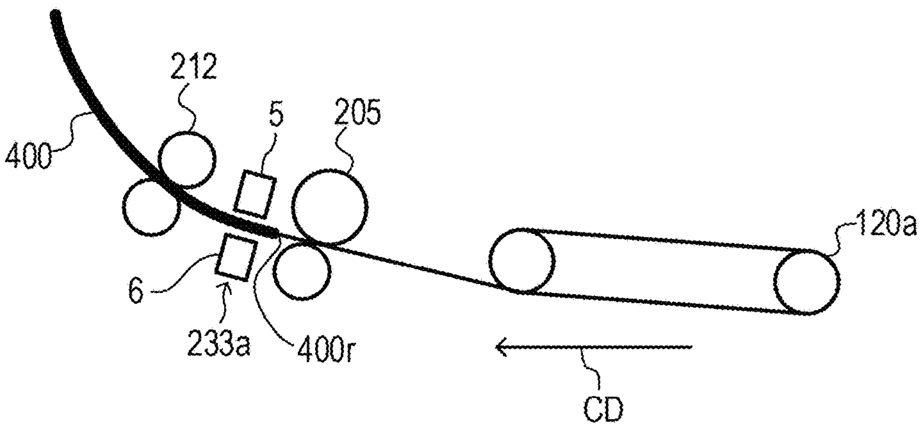

FIG. 4A, FIG. 4B, and FIG. 4C are enlarged views for illustrating the sheet conveyance path 250 from the feeding portion 120*a* to the conveyance roller pair 212. FIG. 4A, FIG. 4B, and FIG. 4C show states in which a sheet 400 is fed from the feeding portion 120*a* in time series. The double-feed detector 233*a* includes, as described above, the ultrasonic oscillator 5 and the ultrasonic receiver 6. The ultrasonic receiver 6 receives an ultrasonic wave oscillated from the ultrasonic oscillator 5. The CPU 301 determines whether or not the sheet 400 fed from the feeding portion 120*a* is double-fed sheets based on the attenuation level of the ultrasonic wave received by the ultrasonic receiver 6. Thus, it is required to perform oscillation, reception, and determination of the ultrasonic wave, and a predetermined time period is required for one double-feed detecting operation. In the first embodiment, it is assumed that the predetermined time period required for one double-feed detecting operation (hereinafter referred to as "sampling time period S") is 25 milliseconds (ms). The double-feed detector 233*a* executes the double-feed detecting operation at an interval of the sampling time period S (predetermined time interval) while the sheet 400 passes through the double-feed detector 233*a*. Further, it is assumed that a conveyance speed V of the sheet 400 in the first embedment is 1,000 mm/sec. During one feeding operation performed by the feeding portion 120*a*, the double-feed detector 233*a* executes double-feed detecting operation a plurality of times.

FIG. 4A is a view for illustrating a state at the timing at which the double-feed detection is started. The double-feed detection is started at the timing at which a leading edge portion 400*t* of the sheet 400 in a conveyance direction CD has passed away a detection position DP of the double-feed detector 233*a* by a predetermined distance B. The leading edge portion 400*t* of the sheet 400 greatly flutters due to vibrations of the sheet 400 at the time of conveyance and the like, and hence it is highly possible that double-feed is erroneously detected when the double-feed detection is performed at the leading edge portion 400*t* of the sheet 400. In view of the above, the double-feed detection is started at the timing at which the leading edge portion 400*t* of the sheet 400 has passed away the double-feed detector 233*a* by the predetermined distance (fluttering stabilization distance) B. In the first embodiment, the predetermined distance B is set to 20 mm. However, the predetermined distance B is not limited to 20 mm, and is only required to be a distance that is not affected by the fluttering of the sheet 400.

The sheet 400 is conveyed even while the double-feed detection is executed, and, via a state as illustrated in FIG. 4B, a trailing edge portion 400*r* of the sheet 400 in the conveyance direction CD finally reaches the double-feed detector 233*a* as illustrated in FIG. 4C. A time period required from the state of FIG. 4A to the state of FIG. 4C varies depending on a length L of the sheet 400 in the conveyance direction CD. Thus, a predetermined number of times Cmax (maximum number of detections) in which the double-feed detection is executed from when the leading edge portion 400*t* of the sheet 400 reaches the double-feed detector 233*a* to when the trailing edge portion 400*r* passes through the double-feed detector 233*a* varies depending on the length L of the sheet 400. The predetermined number of times Cmax can be obtained by Equation (1) below through use of the length L (mm) of the sheet 400 in the conveyance direction CD, the predetermined distance B (mm), the conveyance speed V (mm/sec) of the sheet 400, and the sampling time period S (sec).

$$Cmax = \left\lfloor \frac{(L-B)}{V} / S \right\rfloor \qquad \text{Equation (1)}$$

In the first embodiment, the double-feed detecting operation is performed the predetermined number of times Cmax with respect to conveyance of one sheet, and, when the double-feed is detected even once, it is determined that the double-feed has been detected at this time point.

Figure 5:
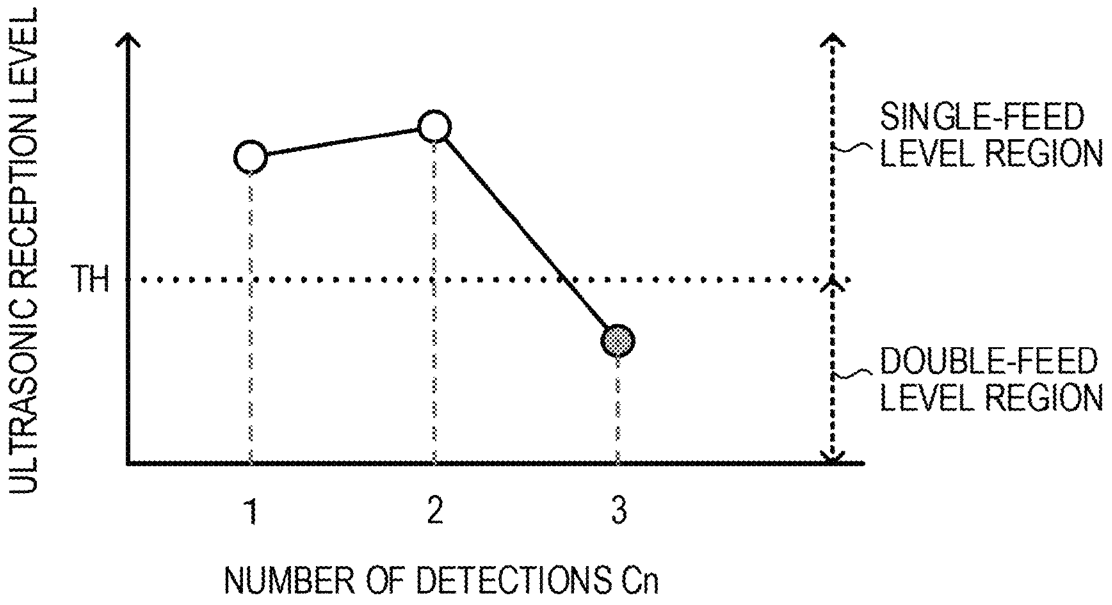
FIG. 5 is a graph for showing a relationship between the number of detections and an ultrasonic reception level.

FIG. 5 is a graph for showing a relationship between the number of detections Cn and an ultrasonic reception level. The number of detections Cn is the number of times of double-feed detecting operation performed during one feeding operation. In a state in which the sheet is single-fed, that is, a state in which the sheets are not double-fed, the ultrasonic wave oscillated from the ultrasonic oscillator 5 is not attenuated so much, and the ultrasonic reception level received by the ultrasonic receiver 6 is high. Meanwhile, in a state in which the sheets are double-fed, the ultrasonic wave oscillated from the ultrasonic oscillator 5 is attenuated, and the ultrasonic reception level received by the ultrasonic receiver 6 is low. In view of the above, a level threshold value TH regarding the ultrasonic reception level is provided (dotted line of FIG. 5). A region in which the ultrasonic reception level is higher than the level threshold value TH is referred to as "single-feed level region," and a region in which the ultrasonic reception level is equal to or lower than the level threshold value TH is referred to as "double-feed level region." The CPU 301 compares the ultrasonic reception level and the level threshold value TH to each other, and determines that the sheet is single-fed, that is, the sheets are not double-fed when the ultrasonic reception level is higher than the level threshold value TH. On the other hand, when the ultrasonic reception level is equal to or lower than the level threshold value TH, the CPU 301 determines that the sheets are double-fed. For example, in FIG. 5, at the third double-feed detecting operation (number of detections Cn=3), the CPU 301 determines that the sheets are double-fed.

(Double-Feed Detection Processing)

Figure 6:
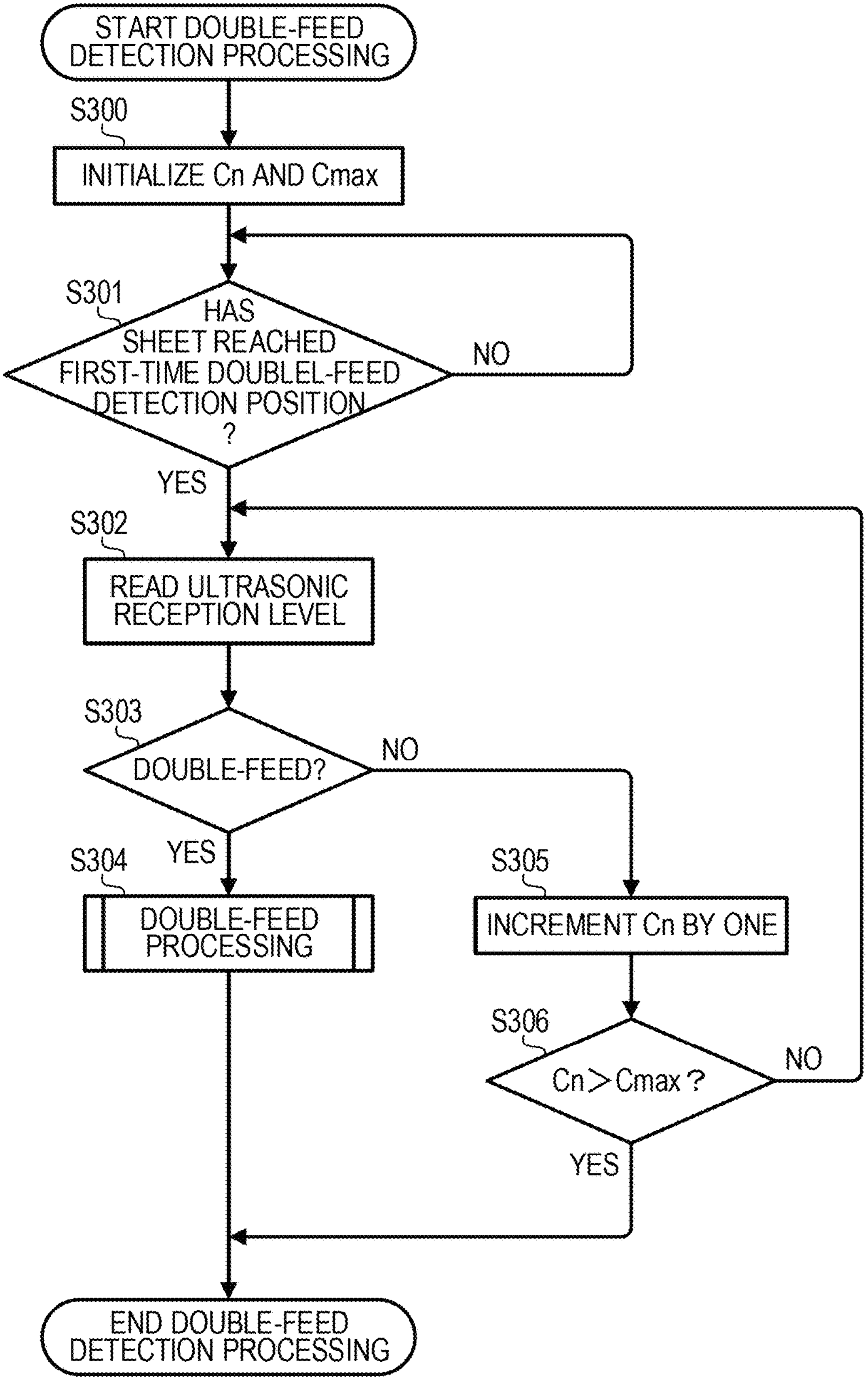
FIG. 6 is a flowchart for illustrating double-feed detection processing to be executed by a CPU in the first embodiment.

Next, with reference to FIG. 6, the operation of the double-feed detection processing to be executed by the CPU 301 serving as a controller is described. FIG. 6 is a flowchart for illustrating the double-feed detection processing to be executed by the CPU 301 in the first embodiment. The CPU 301 executes the double-feed detection processing in accordance with the program stored in the ROM 302. The double-feed detection processing is executed every time the sheet is fed from the sheet stacking portion 110*a*, 110*b*, or 110*c*. In the first embodiment, a case in which the sheet is fed from the sheet stacking portion 110*a* is described.

When the double-feed detection processing is started, in Step S300, the CPU 301 initializes the number of detections Cn and the predetermined number of times Cmax. The number of detections Cn is a count value indicating which number of times the double-feed detection is to be performed at present. The number of detections Cn is stored in the RAM 303. As the number of detections Cn, 1 is set as an initial value. The predetermined number of times Cmax is a value indicating the number of times to perform the double-feed detection at maximum. In the first embodiment, the maximum number of times to perform the double-feed detection with respect to one sheet (a plurality of overlapping sheets in the case of the double-feed) conveyed in the conveyance direction CD is the predetermined number of times Cmax.

In Step S301, the CPU 301 determines whether or not the sheet has reached a first-time double-feed detection position at which the double-feed detection can be started. The first-time double-feed detection position is a position at which, as described above, the leading edge portion 400*t* of the sheet has passed away the double-feed detector 233*a* by the predetermined distance B so that the influence of the fluttering of the leading edge portion of the sheet to be subjected to the double-feed detection is reduced (FIG. 4A). In a case in which the sheet has not reached the first-time double-feed detection position (NO in Step S301), the CPU 301 returns the process to Step S301, and waits until the leading edge portion of the sheet reaches the first-time double-feed detection position. In a case in which the leading edge portion of the sheet has reached the first-time double-feed detection position (YES in Step S301), the CPU 301 advances the process to Step S302. In Step S302, the CPU 301 starts the double-feed detection to read the ultrasonic reception level serving as a detection result obtained by the double-feed detector 233*a*. As described above, the ultrasonic wave oscillated from the ultrasonic oscillator 5 is received by the ultrasonic receiver 6, and the CPU 301 reads the ultrasonic reception level received by the ultrasonic receiver 6.

In Step S303, the CPU 301 determines whether or not double-feed has occurred. As described above, the CPU 301 determines whether or not double-feed has occurred based on the attenuation level of the ultrasonic wave. As described above with reference to FIG. 5, the CPU 301 compares the ultrasonic reception level and the level threshold value TH to each other to determine that the sheets are not double-fed in a case in which the ultrasonic reception level is higher than the level threshold value TH. In a case in which the ultrasonic reception level is equal to or lower than the level threshold value TH, the CPU 301 determines that the sheets are double-fed. In a case in which the CPU 301 determines that the sheets are not double-fed (NO in Step S303), in Step S305, the CPU 301 increments the number of detections Cn by 1.

After that, in Step S306, the CPU 301 determines whether or not the number of detections Cn is larger than the predetermined number of times Cmax. In a case in which the CPU 301 determines that the number of detections Cn is larger than the predetermined number of times Cmax (YES in Step S306), the CPU 301 ends the double-feed detection processing. Meanwhile, in a case in which the CPU 301 determines that the number of detections Cn is not larger than the predetermined number of times Cmax (NO in Step S306), the CPU 301 returns the process to Step S302, and performs the double-feed detection again to read the ultrasonic reception level from the double-feed detector 233*a*. In a case in which the CPU 301 determines that the double-feed has occurred (YES in Step S303), in Step S304, the CPU 301 performs double-feed processing.

(Double-Feed Processing)

Figure 7:
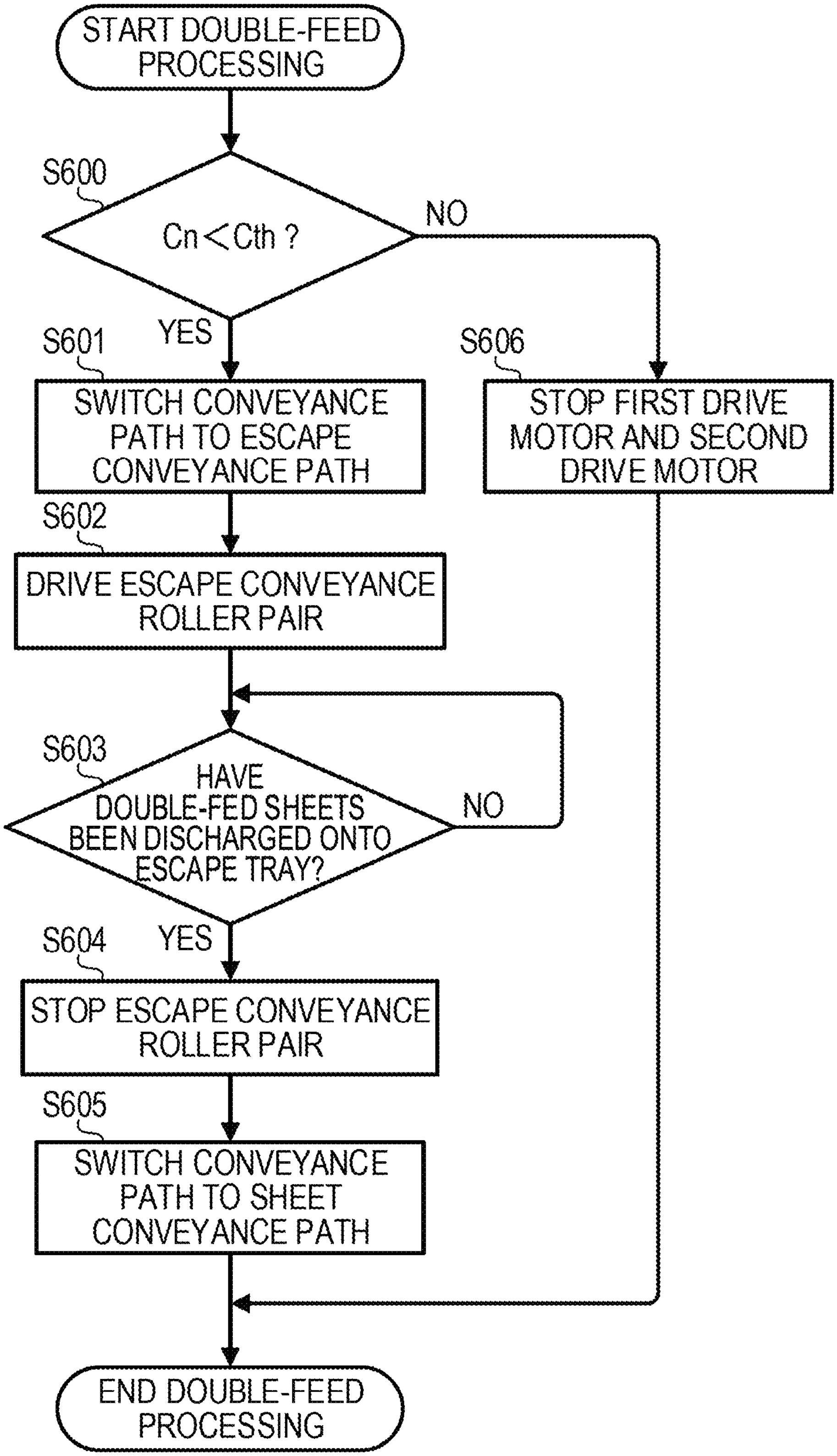
FIG. 7 is a flowchart for illustrating double-feed processing to be executed by the CPU in the first embodiment.

With reference to FIG. 7, the operation of the double-feed processing to be executed by the CPU 301 in the first embodiment is described. FIG. 7 is a flowchart for illustrating the double-feed processing to be executed by the CPU 301 in the first embodiment. In Step S600, the CPU 301 determines whether or not the number of detections Cn is smaller than a count threshold value Cth (predetermined threshold value). The count threshold value Cth is a threshold value regarding the number of detections Cn for determining whether to convey the double-fed sheets to the escape tray 232 or to stop the double-fed sheets without conveying the double-fed sheets to the escape tray 232. In the first embodiment, the count threshold value Cth is set to 50. Details of the count threshold value Cth are described later. The CPU 301 can execute a first mode of discharging the double-fed sheets onto the escape tray 232 via the escape conveyance path 251 and a second mode of stopping the double-fed sheets on the sheet conveyance path 250 without discharging the double-fed sheets onto the escape tray 232. The CPU 301 executes the first mode in a case in which the number of detections Cn of the double-feed detecting operation when the double-feed is detected is smaller than the count threshold value Cth, and executes the second mode in a case in which the number of detections Cn is equal to or larger than the count threshold value Cth.

In a case in which the CPU 301 determines that the number of detections Cn is smaller than the count threshold value Cth (YES in Step S600), in Step S601, the CPU 301 switches the conveyance path to the escape conveyance path 251 by the conveyance path switcher 235. Specifically, the CPU 301 controls the conveyance path switcher 235 to switch the posture of the switching member 237 provided at the branch-off portion 231 to the second position SP.

In Step S602, the CPU 301 drives the escape conveyance roller pair 215. The escape conveyance roller pair 215 discharges the double-fed sheets that have been conveyed to the escape conveyance path 251 onto the escape tray 232. In Step S603, the CPU 301 determines whether or not the double-fed sheets have been discharged onto the escape tray 232. In a case in which the double-fed sheets have not been discharged onto the escape tray 232 (NO in Step S603), the CPU 301 returns the process to Step S603, and waits until the double-fed sheets are discharged onto the escape tray 232. Specifically, the CPU 301 waits until a sheet trailing edge portion detector (sheet sensor) 240 arranged on the downstream side of the escape conveyance roller pair 215 detects the trailing edge portion of the double-fed sheets. When the sheet trailing edge portion detector 240 detects the trailing edge portion of the double-fed sheets, the CPU 301 determines that the double-fed sheets have been discharged onto the escape tray 232 (YES in Step S603), and the CPU 301 advances the process to Step S604.

In Step S604, the CPU 301 stops the escape conveyance roller pair 215. After that, in Step S605, the CPU 301 switches the conveyance path to the sheet conveyance path 250. Specifically, the CPU 301 controls the conveyance path switcher 235 to switch the posture of the switching member 237 at the branch-off portion 231 to the first position FP. The CPU 301 ends the double-feed processing.

In Step S600, in a case in which the CPU 301 determines that the number of detections Cn is equal to or larger than the count threshold value Cth (equal to or larger than the predetermined threshold value) (NO in Step S600), the CPU 301 stops the first drive motor 234*a* and the second drive motor 234*b* (Step S606). In this manner, the double-fed sheets are stopped without being discharged onto the escape tray 232. The CPU 301 ends the double-feed processing.

(Count Threshold Value)

Figure 8:
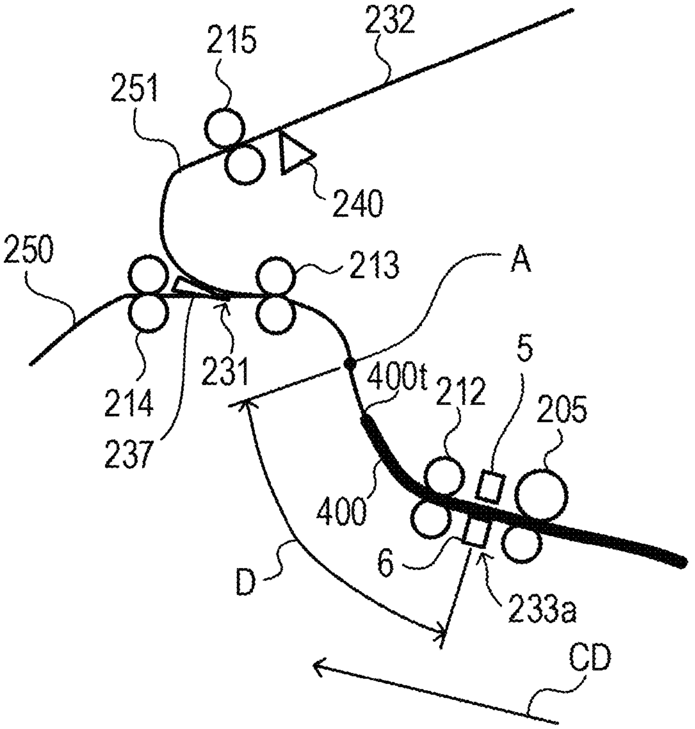
FIG. 8 is an enlarged view of a sheet conveyance path and an escape conveyance path in the first embodiment.

With reference to FIG. 8, the count threshold value Cth is described. FIG. 8 is an enlarged view for illustrating the sheet conveyance path 250 and the escape conveyance path 251 in the first embodiment. FIG. 8 shows the position of the leading edge portion 400*t* of the sheet 400 conveyed in the conveyance direction CD by the conveyance roller pairs 205 and 212. In order to convey the sheet 400 to the escape conveyance path 251, it is required to switch the posture of the switching member 237 provided at the branch-off portion 231 to the second position SP. It is required to switch the posture of the switching member 237 to the second position SP before the leading edge portion 400*t* of the sheet 400 enters the branch-off portion 231, but it takes time to switch the posture of the switching member 237 from the first position FP to the second position SP. In the first embodiment, it is assumed that a time period required for the posture of the switching member 237 to be switched from the first position FP to the second position SP is 0.1 sec. The conveyance speed V of the sheet 400 is, as described above, 1,000 mm/sec, and hence it is required to start switching of the posture of the switching member 237 before the leading edge portion 400*t* of the sheet 400 reaches a predetermined position A that is separated by 100 mm from the branch-off portion 231 in a direction opposite to the conveyance direction CD. Accordingly, if the double-feed is detected before the leading edge portion 400*t* of the sheet 400 reaches the predetermined position A illustrated in FIG. 8, the sheet 400 can be conveyed to the escape conveyance path 251.

In the first embodiment, it is assumed that a way (distance) D from the position of the double-feed detector 233*a* to the predetermined position A is 2,000 mm. In this case, a maximum value Cth (max) of the count threshold value Cth can be obtained by Equation (2) below through use of the conveyance speed V (1,000 mm/sec), the sampling time period S (25 msec), and the predetermined distance B (20 mm) being the fluttering stabilization distance. The count threshold value Cth is required to be a value smaller than the maximum value Cth (max).

$$Cth(\max) = \left\lfloor \frac{(D-B)}{V} / S \right\rfloor \qquad \text{Equation (2)}$$

In the first embodiment, from Equation (2), the maximum value Cth (max) of the count threshold value Cth is 79. However, in an actual case, there are error factors such as mechanical tolerance (dimensional tolerance of components, geometric tolerance, assembly tolerance) and fluctuations in an operation frequency of the CPU 301, and hence, in the first embodiment, the count threshold value Cth is set to 50.

As described above, the timing at which the double-feed is detected is converted into the number of detections Cn in which the double-feed detections are executed until the double-feed is detected. Through comparison between the number of detections Cn and the count threshold value Cth, it is determined whether to discharge the double-fed sheets onto the escape tray 232 or to stop the double-fed sheets on the conveyance path without discharging the double-fed sheets onto the escape tray 232. In the first embodiment, in a case in which the sheets can be conveyed to the escape conveyance path 251 at a time point at which the double-feed has been detected, the sheets are discharged onto the escape tray 232 via the escape conveyance path 251. For example, in a case in which the leading edge of the sheet is located on the downstream side with respect to the branch-off portion 231 at a time point at which the double-feed has been detected, the sheet is stopped.

Thus, the double-fed sheets can be discharged onto the escape tray 232 as much as possible, and in a case in which the switching of the switching member 237 cannot be ready in time, the double-fed sheets can be stopped on the sheet conveyance path 250. In this manner, the sheet conveyance path 250 can be shortened without mixing the double-fed sheets into the printed product. According to the first embodiment, even if the sheet conveyance path 250 is shortened, the double-fed sheets can be discharged onto the escape tray 232 as much as possible.

Second Embodiment

Now, a second embodiment is described. In the first embodiment, the count threshold value Cth has been used in order to switch the posture of the switching member 237 to the second position SP before the leading edge portion 400*t* of the sheet 400 fed from the feeding portion 120*a* reaches the predetermined position A. In the second embodiment, a method of setting the count threshold value Cth in a case in which the sheet 400 is fed from one of other feeding portions 120*b* and 120*c* is described. In the second embodiment, structures similar to those of the first embodiment are denoted by similar reference symbols, and description thereof is omitted.

In a case in which the configurations of the other feeding portions 120*b* and 120*c* are different from the configuration of the feeding portion 120*a*, even if the way D from each of the double-feed detectors 233*a*, 233*b*, and 233*c* to the predetermined position A is the same, the predetermined distance B being the fluttering stabilization distance may be different. If the predetermined distance B is different, the maximum value Cth (max) obtained from Equation (2) is different, and hence the count threshold value Cth is also set to a value different for each of the feeding portions 120*a*, 120*b*, and 120*c*. In the second embodiment, it is assumed that the feeding portions 120*a*, 120*b*, and 120*c* have the same configuration, and the predetermined distance B being the fluttering stabilization distance of each of the feeding portions 120*a*, 120*b*, and 120*c* is also the same. However, in the second embodiment, it is assumed that the way D from each of the double-feed detectors 233_a_, 233_b_, and 233_c_ to the predetermined position A is different.

The double-feed detection of the sheet 400 is performed by any one of the double-feed detectors 233_a_, 233_b_, and 233_c_ depending on the feeding portion 120_a_, 120_b_, or 120_c_ that feeds the sheet 400. That is, in a case in which the sheet 400 is fed from the feeding portion 120_a_, the double-feed detector 233_a_ performs the double-feed detection. In a case in which the sheet 400 is fed from the feeding portion 120_b_, the double-feed detector 233_b_ performs the double-feed detection. In a case in which the sheet 400 is fed from the feeding portion 120_c_, the double-feed detector 233_c_ performs the double-feed detection. Even in the second embodiment, the CPU 301 can execute the first mode of discharging the double-fed sheets onto the escape tray 232 via the escape conveyance path 251 and the second mode of stopping the double-fed sheets on the sheet conveyance path 250 without discharging the double-fed sheets onto the escape tray 232. In a case in which any one of the plurality of double-feed detectors 233_a_, 233_b_, and 233_c_ detects the double-feed, the CPU 301 switches the mode between the first mode and the second mode in accordance with the timing at which the double-feed is detected. The criterion for determining this timing may be different between at least two or more of the plurality of double-feed detectors 233_a_, 233_b_, and 233_c_.

Figure 9:
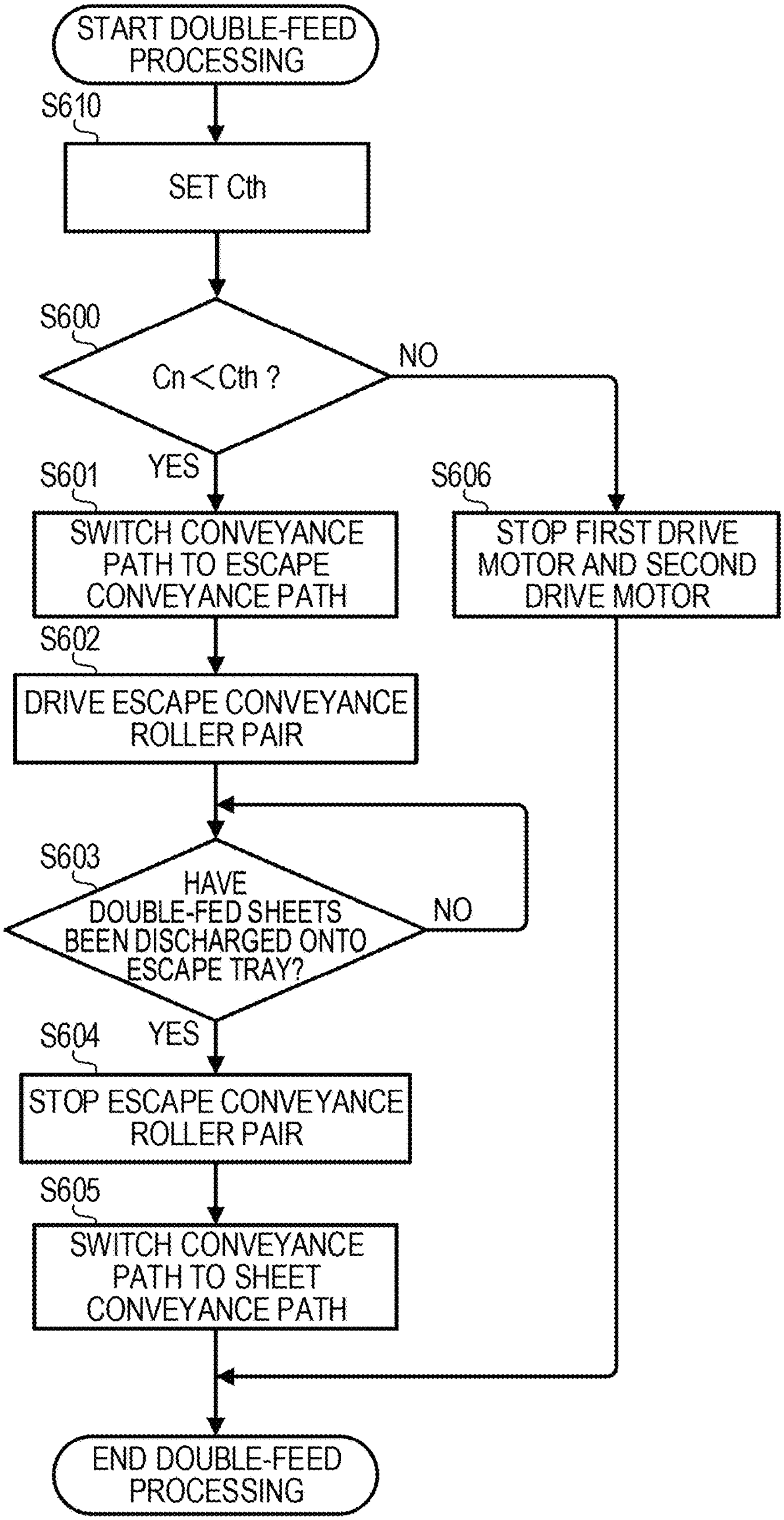
FIG. 9 is a flowchart for illustrating double-feed processing to be executed by a CPU in a second embodiment.

FIG. 9 is a flowchart for illustrating the double-feed processing to be executed by the CPU 301 in the second embodiment. The double-feed processing is different from the double-feed processing illustrated in FIG. 7 in the first embodiment in that, before the CPU 301 compares the number of detections Cn and the count threshold value Cth to each other in Step S600, the count threshold value Cth is set in accordance with the feeding portion 120_a_, 120_b_, or 120_c_ that feeds the sheet 400. In Step S610, the CPU 301 sets the count threshold value Cth in accordance with the feeding portion 120_a_, 120_b_, or 120_c_ that feeds the sheet 400.

(Setting of Count Threshold Value)

Now, the method of setting the count threshold value Cth is described. It is assumed that a way Da from the position of the double-feed detector 233_a_ configured to detect the sheet fed from the sheet stacking portion 110_a_ to the predetermined position A is 1,400 mm. It is assumed that a way Db from the position of the double-feed detector 233_b_ configured to detect the sheet fed from the sheet stacking portion 110_b_ to the predetermined position A is 2,100 mm. It is assumed that a way Dc from the position of the double-feed detector 233_c_ configured to detect the sheet fed from the sheet stacking portion 110_c_ to the predetermined position Ais 2,800 mm. The maximum value Cth (max) of the count threshold value Cth of each of the sheet stacking portions 110_a_, 110_b_, and 110_c_ can be obtained by Equation (2) described above through use of the conveyance speed V (1,000 mm/sec), the sampling time period S (25 msec), and the predetermined distance B (20 mm).

The way D of Equation (2) changes depending on from which of the sheet stacking portions 110_a_, 110_b_, and 110_c_ the sheet is fed. Any one of the ways Da, Db, and Dc is substituted into the way D of Equation (2). The ways Da, Db, and Dc have values different from each other, and hence the value of the maximum value Cth (max) also varies depending on from which of the sheet stacking portions 110_a_, 110_b_, and 110_c_ the sheet is fed. Moreover, the count threshold value Cth is set to a value smaller than the maximum value Cth (max). Those values are summarized in Table 1 below.

TABLE 1

| Feeding position | D (mm) | Cth (max) | Cth |
|---|---|---|---|
| Sheet stacking portion 110a | 1,400(Da) | 39 | 31 |
| Sheet stacking portion 110b | 2,100(Db) | 67 | 53 |
| Sheet stacking portion 110c | 2,800(Dc) | 95 | 76 |

In the second embodiment, in consideration of error factors such as mechanical tolerance (dimensional tolerance of components, geometric tolerance, assembly tolerance), slipping of a sheet at the time of conveyance, and fluctuations in an operation frequency of the CPU 301, the count threshold value Cth is set to a value that is 80% of the maximum value Cth (max).

As described above, the timing at which the double-feed is detected by the plurality of double-feed detectors 233_a_, 233_b_, and 233_c_ is converted into the number of detections Cn in which the double-feed detection is executed until the double-feed is detected. Whether to discharge the double-fed sheets onto the escape tray 232 or to stop the double-fed sheets on the sheet conveyance path 250 without discharging the double-fed sheets onto the escape tray 232 is determined based on the number of detections Cn at the time when the double-feed is detected. The determination is made by comparing the number of detections Cn and the count threshold value Cth to each other. The count threshold value Cth is changed depending on the double-feed detector 233_a_, 233_b_, or 233_c_ corresponding to the sheet stacking portion 110_a_, 110_b_, or 110_c_ from which the sheet is fed. Thus, no matter from which of the feeding portions 120_a_, 120_b_, and 120_c_ the sheet is fed, the double-fed sheets are discharged onto the escape tray 232 as much as possible. Further, in a case in which the double-fed sheets cannot be discharged onto the escape tray 232 because the switching of the switching member 237 cannot be ready in time, the double-fed sheets can be stopped on the sheet conveyance path 250. In this manner, the sheet conveyance path 250 can be shortened without mixing the double-fed sheets into the printed product. According to the second embodiment, even if the sheet conveyance path 250 is shortened, the double-fed sheets can be discharged onto the escape tray 232 as much as possible.

Third Embodiment

Now, a third embodiment is described. In the first embodiment and the second embodiment, double-feed detection for the sheet conveyed in the conveyance direction CD is performed a plurality of times, and whether or not to discharge the double-fed sheets onto the escape tray 232 is determined based on the number of detections Cn indicating which number of times of double-feed detection the double-feed has been detected. In the third embodiment, a determination method different from the determination method in the first embodiment is used. In the third embodiment, structures similar to those of the first embodiment are denoted by similar reference symbols, and description thereof is omitted.

(Image Forming Apparatus)

Figure 10:
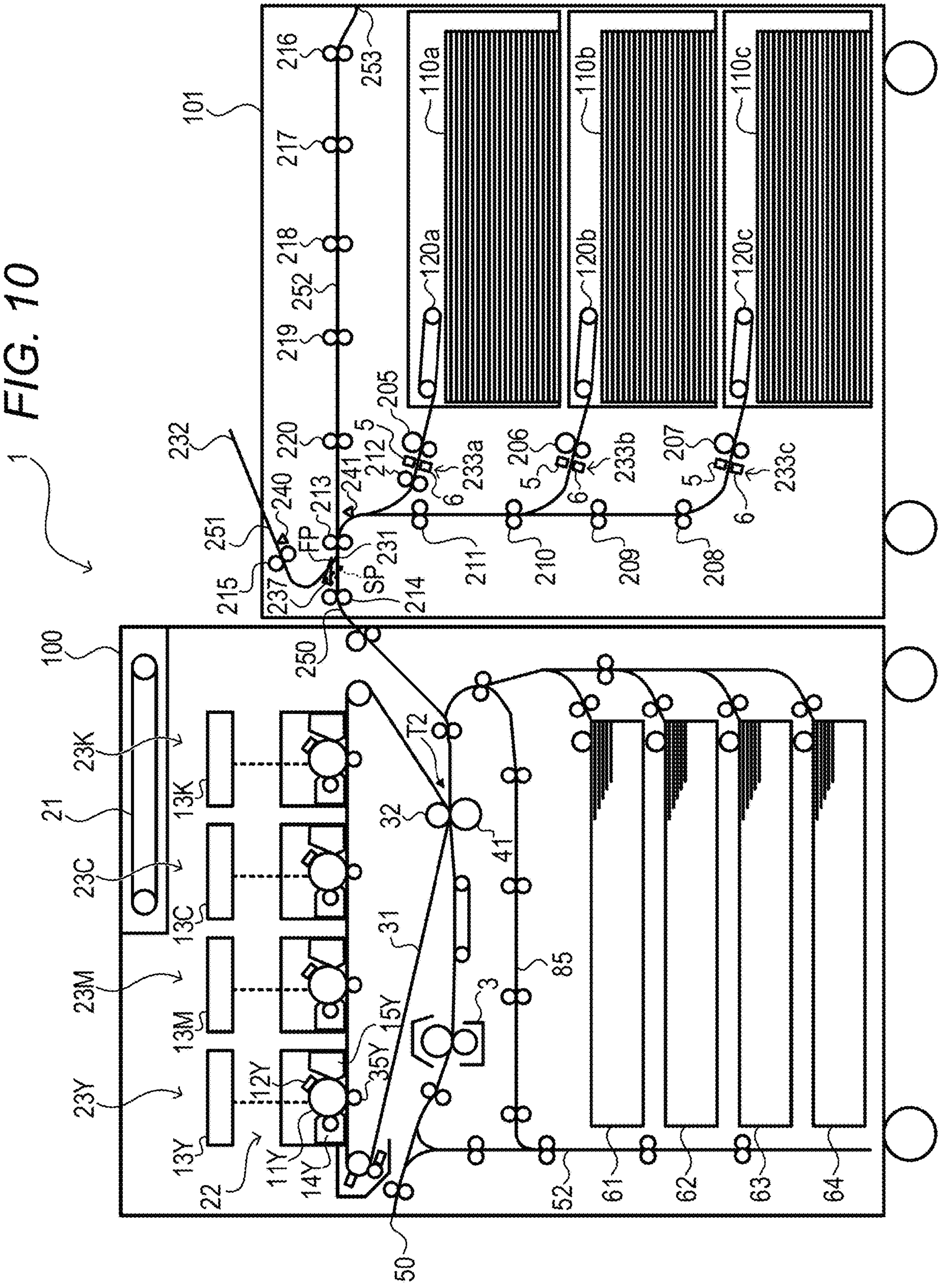
FIG. 10 is a cross-sectional view for illustrating a printer of a third embodiment.

An overall configuration of a printer 1 serving as an image forming apparatus according to a third embodiment is described with reference to FIG. 10. FIG. 10 is a cross-sectional view for illustrating the printer 1 of the third embodiment. The printer 1 of the third embodiment illustrated in FIG. 10 is different from the printer 1 of the first embodiment illustrated in FIG. 1 in that a sheet sensor 241 is provided on the sheet conveyance path 250 of the paper deck 101. Other configurations of the printer 1 of the third embodiment are similar to the configurations of the printer 1 of the first embodiment, and hence description thereof is omitted. The sheet sensor 241 is a sensor configured to detect whether or not there is a sheet in the detection position. The sheet sensor 241 may be a transmission-type sensor such as a photo-interrupter or may be a reflection-type sensor configured to detect reflected light. There is no limit to the type of the sheet sensor 241.

(Control Device)

Figure 11:
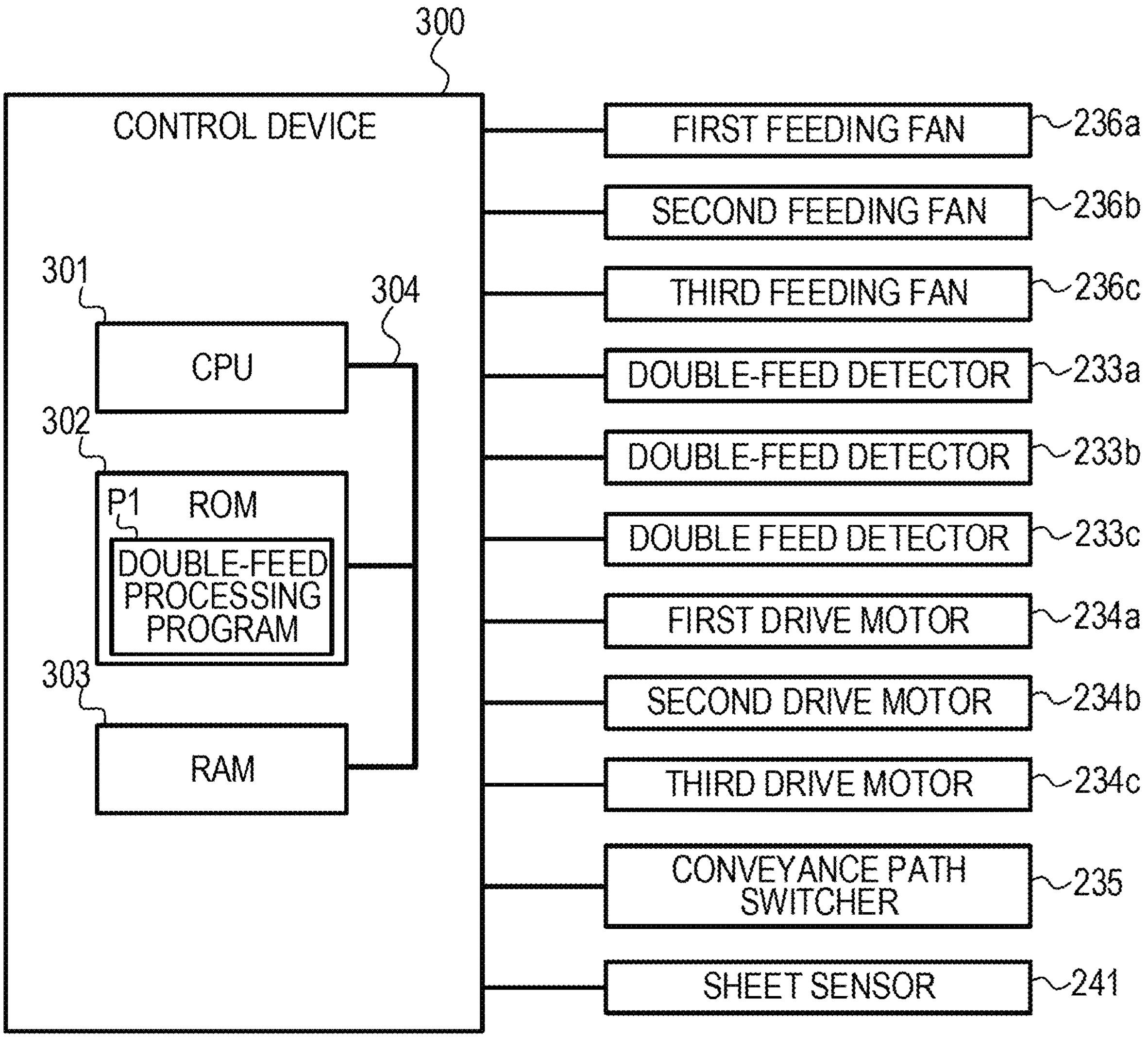
FIG. 11 is a block diagram for illustrating a control device in the third embodiment.

The configuration of the control device 300 of the paper deck 101 in the third embodiment is described. FIG. 11 is a block diagram for illustrating the control device 300 in the third embodiment. As illustrated in FIG. 11, the control device 300 in the third embodiment is different from the control device 300 in the first embodiment in that the control device 300 is electrically connected to the sheet sensor 241. Other configurations are similar to those of the control device 300 in the first embodiment.

(Double-Feed Detection Processing)

Figure 12:
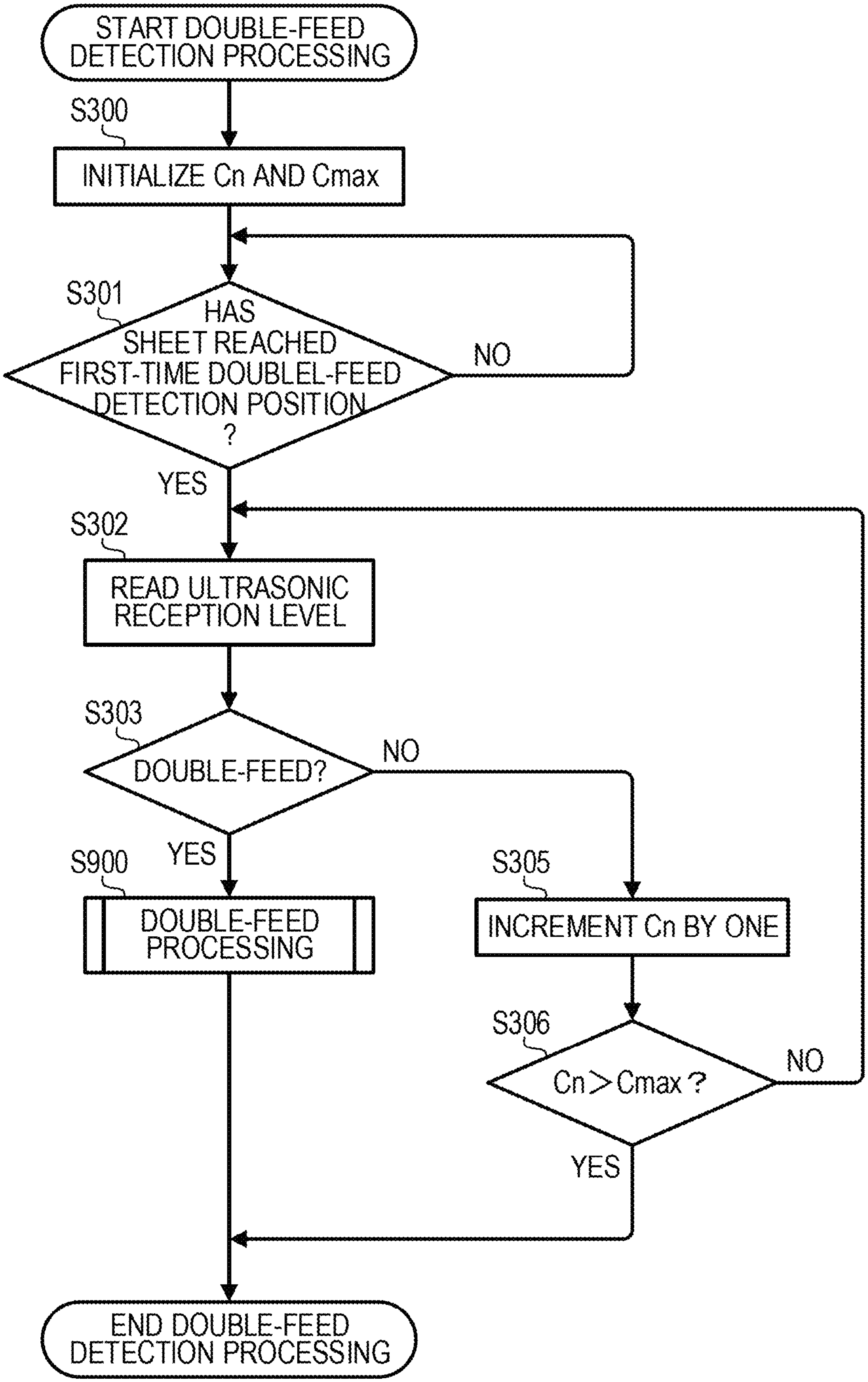
FIG. 12 is a flowchart for illustrating double-feed detection processing to be executed by a CPU in the third embodiment.

Next, with reference to FIG. 12, the operation of the double-feed detection processing to be executed by the CPU 301 is described. FIG. 12 is a flowchart for illustrating the double-feed detection processing to be executed by the CPU 301 in the third embodiment. The CPU 301 executes the double-feed detection processing in accordance with the program stored in the ROM 302. In the double-feed detection processing in the third embodiment, the double-feed processing of Step S900 is different from the double-feed processing of Step S304 in the first embodiment illustrated in FIG. 6, and other processing steps are similar to those in the first embodiment. Now, the double-feed processing of Step S900 is described.

(Double-Feed Processing)

Figure 13:
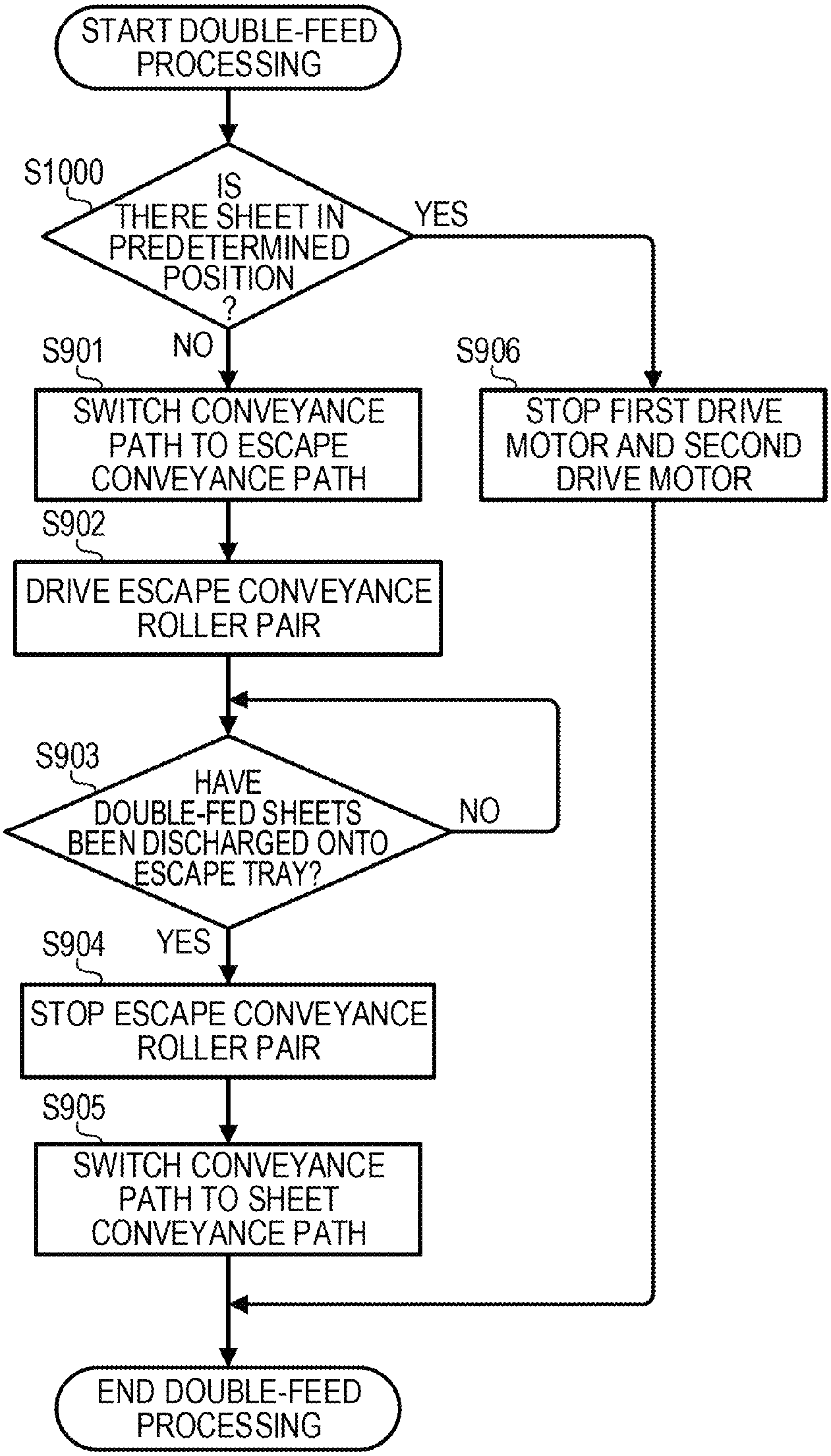
FIG. 13 is a flowchart for illustrating double-feed processing to be executed by the CPU in the third embodiment.
Figure 14A:
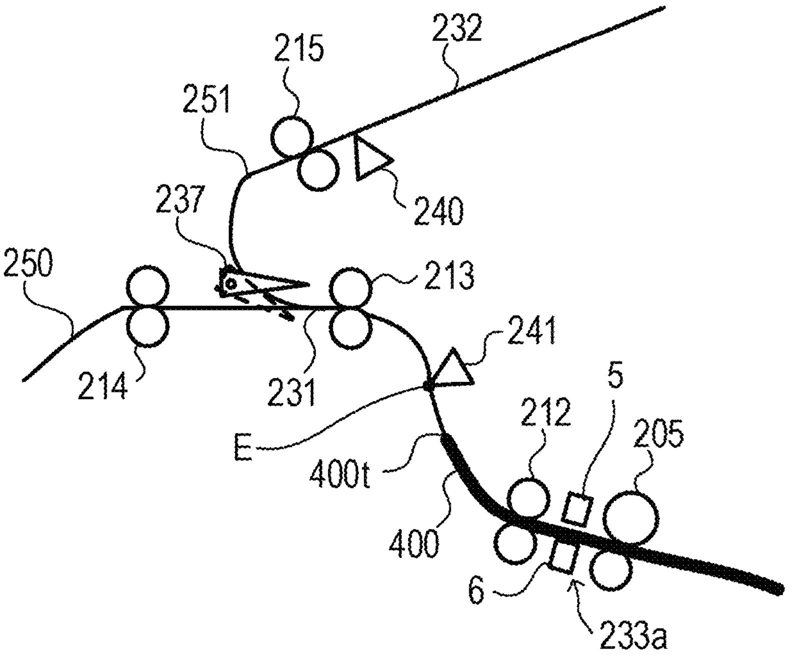
FIG. 14A and FIG. 14B are enlarged views of a sheet conveyance path and an escape conveyance path in the third embodiment.

With reference to FIG. 13, the operation of the double-feed processing to be executed by the CPU 301 in the third embodiment is described. FIG. 13 is a flowchart for illustrating the double-feed processing to be executed by the CPU 301 in the third embodiment. Step S1000 is different from the operation of the double-feed processing described in the first embodiment. Other processing steps of Steps S901, S902, S903, S904, S905, and S906 are similar to the processing steps of Steps S601, S602, S603, S604, S605, and S606 in the double-feed processing of FIG. 7 described in the first embodiment. Thus, in the following, the processing step of Step S1000 is described. In Step S1000, the CPU 301 determines whether or not there is a sheet in a predetermined position E (FIG. 14A). In this case, the predetermined position E in the third embodiment is the detection position at which the sheet sensor 241 detects the sheet on the sheet conveyance path 250. The predetermined position E is located on the upstream side of the branch-off portion 231 in the conveyance direction of the sheet, and on the downstream side of the double-feed detector 233*a*. The CPU 301 switches the mode between the first mode and the second mode based on the detection result obtained by the sheet sensor 241 when the double-feed detector 233*a* detects the double-feed.

Figure 14B:
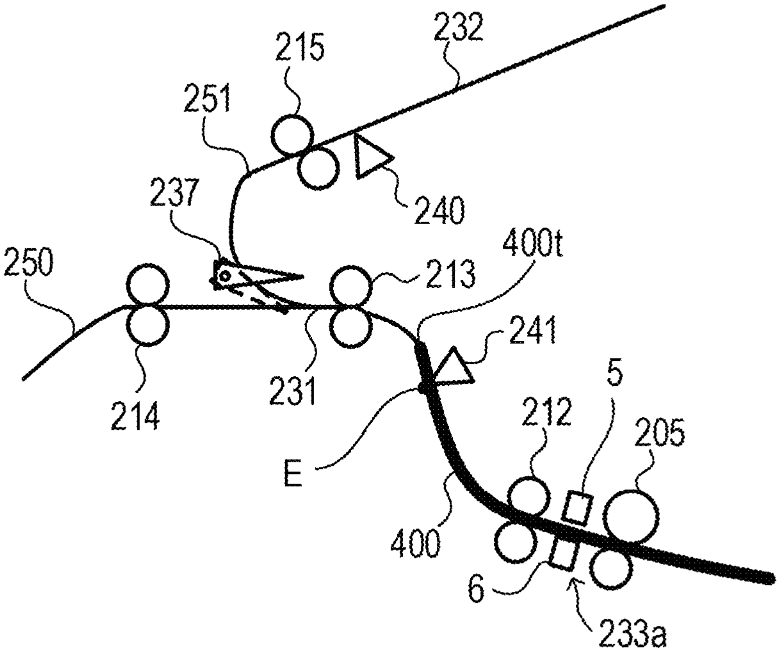

FIG. 14A and FIG. 14B are enlarged views for illustrating the sheet conveyance path 250 and the escape conveyance path 251 in the third embodiment. FIG. 14A and FIG. 14B show the leading edge portion 400*t* of the sheet 400 conveyed through the sheet conveyance path 250 by the conveyance roller pairs 205 and 212 when the CPU 301 executes the processing step of Step S1000. FIG. 14A is a view for illustrating a state in which the sheet 400 is not detected by the sheet sensor 241 when the CPU 301 executes Step S1000. FIG. 14B is a view for illustrating a state in which the sheet 400 is detected by the sheet sensor 241 when the CPU 301 executes Step S1000. In Step S1000, in a case in which the sheet 400 is not detected by the sheet sensor 241 as illustrated in FIG. 14A, the CPU 301 determines that there is no sheet (NO in Step S1000) and executes the processing step of Step S901 and subsequent processing steps to discharge the sheet 400 onto the escape tray 232. In Step S1000, in a case in which the sheet 400 is detected by the sheet sensor 241 as illustrated in FIG. 14B, the CPU 301 determines that there is a sheet (YES in Step S1000) and executes the processing step of Step S906 to stop the sheet 400 on the sheet conveyance path 250.

According to the third embodiment, whether to discharge the double-fed sheets onto the escape tray 232 or to stop the double-fed sheets on the sheet conveyance path 250 without discharging the double-fed sheets onto the escape tray 232 can be determined based on whether or not the double-fed sheets are conveyed to the predetermined position E at the time when the double-feed is detected. Thus, the double-fed sheets can be discharged onto the escape tray 232 as much as possible, and, in the case in which the switching of the switching member 237 cannot be ready in time, the double-fed sheets can be stopped on the sheet conveyance path 250. In this manner, the sheet conveyance path 250 can be shortened without mixing the double-fed sheets into the printed product. According to the third embodiment, even if the sheet conveyance path 250 is shortened, the double-fed sheets can be discharged onto the escape tray 232 as much as possible.

The electrophotographic image forming portion has been exemplified as the image forming portion in all of the embodiments. However, an ink-jet image forming portion may be employed as the image forming portion.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-078126, filed May 10, 2023, and Japanese Patent Application No. 2024-039125, filed Mar. 13, 2024, which are hereby incorporated by reference herein in their entirety.

What is claimed is:

1. A sheet conveying apparatus comprising:

an apparatus body:

a sheet stacking portion mounted so as to be insertable and drawable from the apparatus body and on which a sheet is to be stacked;

a sheet feeding portion configured to feed the sheet stacked on the sheet stacking portion;

a sheet conveyance path through which the sheet fed by the sheet feeding portion is to be conveyed;

an escape conveyance path branching off from the sheet conveyance path at a branch-off portion;

a sheet discharge portion to which the sheet conveyed through the escape conveyance path is to be discharged;

a double-feed detector configured to detect double-feed of the sheet fed by the sheet feeding portion at a detection position located on an upstream side in a conveyance direction with respect to the branch-off portion, the double-feed detector being disposed so that a path length in the sheet conveyance path from the detection position to the branch-off portion is shorter than a longest length of a sheet in the conveyance direction, the sheet being stacked on the sheet stacking portion and being fed by the sheet feeding portion; and a controller configured to execute, in a case in which the double-feed detector detects the double-feed, a first mode of discharging the sheet for which the double-feed has been detected onto the sheet discharge portion via the escape conveyance path, and a second mode of stopping the sheet for which the double-feed has been detected on the sheet conveyance path without discharging the sheet for which the double-feed has been detected onto the sheet discharge portion, wherein the controller is configured to switch a mode between the first mode and the second mode in accordance with timing at which the double-feed detector detects the double-feed of the sheet.

2. The sheet conveying apparatus according to claim 1, wherein the double-feed detector is configured to execute double-feed detecting operation a plurality of times during one feeding operation performed by the sheet feeding portion, and wherein the controller is configured to switch the mode between the first mode and the second mode in accordance with the number of times of the double-feed detecting operation at the time when the double-feed is detected.

3. The sheet conveying apparatus according to claim 2, wherein the controller is configured to execute the first mode when the number of times of the double-feed detecting operation at the time when the double-feed is detected is smaller than a predetermined threshold value, and wherein the controller is configured to execute the second mode when the number of times is equal to or larger than the predetermined threshold value.

4. The sheet conveying apparatus according to claim 1, wherein the sheet stacking portion includes a plurality of sheet stacking portions, wherein the sheet feeding portion includes a plurality of sheet feeding portions, wherein the double-feed detector includes a plurality of double-feed detectors, wherein the controller is configured to switch the mode between the first mode and the second mode in accordance with the timing at which the double-feed is detected in a case in which any one of the plurality of double-feed detectors detects the double-feed, and wherein a criterion for determining the timing is different between at least two or more of the plurality of double-feed detectors.

5. The sheet conveying apparatus according to claim 4, wherein the criterion differs depending on a distance from the branch-off portion between the sheet conveyance path and the escape conveyance path to each of the plurality of sheet feeding portions.

6. The sheet conveying apparatus according to claim 1, further comprising a sheet sensor configured to detect whether the sheet is present in the detection position in the sheet conveyance path, wherein the controller is configured to switch the mode between the first mode and the second mode based on a detection result obtained by the sheet sensor when the double-feed detector detects the double-feed.

7. An image forming apparatus comprising:

a sheet conveying apparatus according to claim 1; and an image forming portion configured to form an image on the sheet conveyed by the sheet conveying apparatus through the sheet conveyance path on a downstream side of the branch-off portion in the conveyance direction, wherein the controller is configured to switch a mode between the first mode and the second mode in accordance with timing at which the double-feed detector detects the double-feed of the sheet.

8. The sheet conveying apparatus according to claim 1, wherein the double-feed detector is an ultrasonic sensor including an ultrasonic oscillator and an ultrasonic receiver, and wherein the controller is configured to determine whether or not the sheet passing through the double-feed detector is double-fed sheets based on an attenuation degree of the ultrasonic wave detected by the double-feed detector.

9. The sheet conveying apparatus according to claim 1, wherein the controller is configured to switch the mode between the first mode and the second mode in accordance with whether the timing of detection of the double-feed detector is before the sheet reaches a predetermined position upstream of the branch-off portion.

10. The sheet conveying apparatus according to claim 1, wherein a double-feed detection is started at the timing at which a leading edge portion of the sheet has passed the double-feed detector by a predetermined distance.

* * * * *